W. COOPER.
HANDLE FOR SHOVELS AND THE LIKE.
APPLICATION FILED AUG. 13, 1918.
1,297,661.
Patented Mar. 18, 1919.
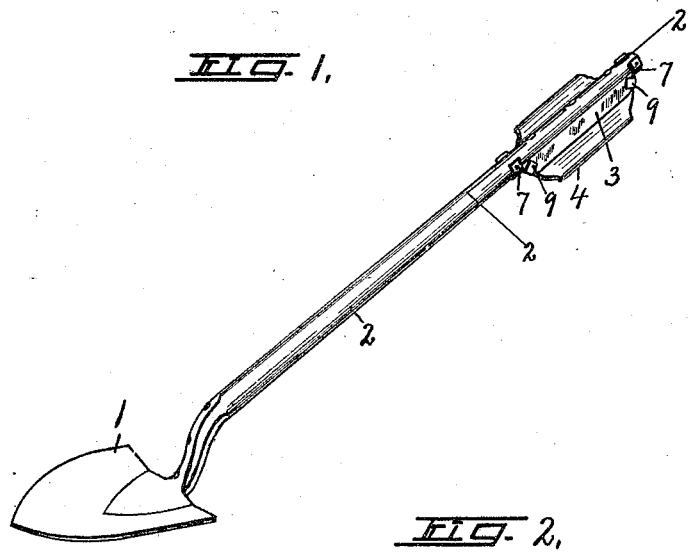
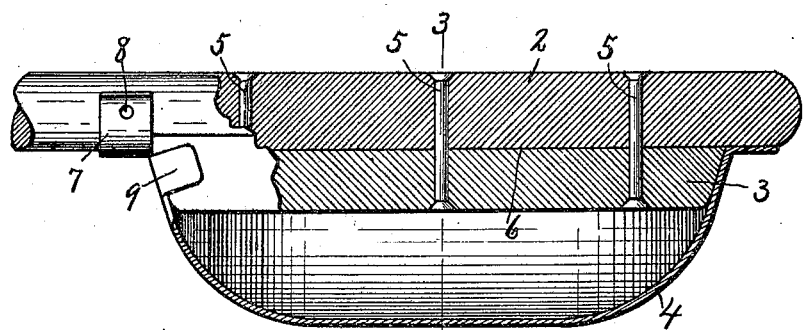
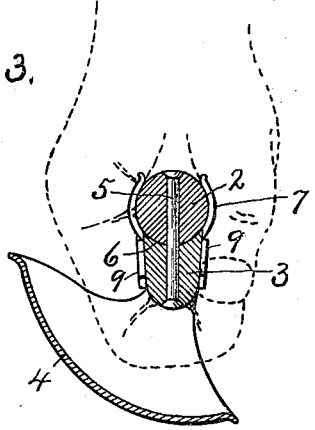
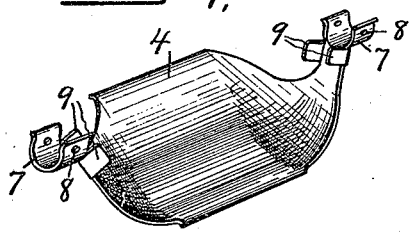
INVENTOR
Wm Cooper
BY Howard P. Denison
ATTORNEY

UNITED STATES PATENT OFFICE.

WILLIAM COOPER, OF SYRACUSE, NEW YORK.

HANDLE FOR SHOVELS AND THE LIKE.

1,297,661. Specification of Letters Patent. Patented Mar. 18, 1919.

Application filed August 13, 1918. Serial No. 249,667.

*To all whom it may concern:*

Be it known that I, WILLIAM COOPER, a citizen of the United States of America, and resident of Syracuse, in the county of Onondaga, in the State of New York, have invented new and useful Improvements in Handles for Shovels and the like, of which the following, taken in connection with the accompanying drawings, is a full, clear, and exact description.

This invention relates to certain improvements in handles for shovels and analogous implements and is particularly useful on the long round handles for shovels commonly used in digging trenches, post-holes and similar and more or less narrow excavations.

In shovels of this character and purpose considerable difficulty is experienced in preventing the shovel from turning in the hand due to overbalanced load on the blade or to more resistance to one side than to the other side of the blade which requires the user to exert abnormal gripping power upon the handle to such an extent in fact as to blister or otherwise injure the hands in order to prevent turning of the shovel about the axis of the handle.

Furthermore, in trench work where the space for manipulation of the shovel is frequently narrow the hand of the operator which grips the handle of the shovel near the free end thereof frequently contacts with the walls of the trench resulting in painful abrasions of the skin and flesh. The object therefore of my present invention is to provide the handle with simple and comparatively inexpensive means whereby the shovel may be held more easily against turning in the hand under comparatively light gripping power.

Another object is to associate with the auxiliary gripping handle a shield for protecting the knuckles and fingers against contact with the walls of the trench and other obstacles.

Other objects and uses relating to specific parts of the handle will be brought out in the following description.

In the drawings:

Figure 1 is a perspective view of a trench shovel showing my invention as applied to the handle thereof.

Fig. 2 is an enlarged longitudinal sectional view, partly in elevation, of the free end of the handle taken on line 2—2 Fig. 1.

Fig. 3 is a transverse sectional view taken in the plane of line 3—3 Fig. —2—.

Fig. 4 is a perspective view of the detached protective shield.

As illustrated the shovel comprises the usual blade —1— and a relatively long round handle —2— which is usually tapered from the shank of the shovel to the free end thereof.

The elements of my invention are adapted to be applied to the handle of shovels of this type near the free end thereof and comprises an auxiliary handle —3— and a protective shield —4— both of which are relatively short as compared with the length of the main handle or of somewhat greater length than the width of the average hand and are preferably secured to the under side of the handle —2— or to the same side as that to which the blade —1— is offset.

The auxiliary handle —3— consists of a block or strip of wood of approximately the same width and depth as that of the main handle —2— and is secured by bolts or rivets —5— to the under side thereof a short distance from the free terminal end, the inner edge being concaved transversely to conform to the peripheral curvature of the handle —2— to which it is applied thus forming a longitudinal groove —6— into which the adjacent portion of the main handle is seated. The opposite or lower edge of the auxiliary handle —3— is convexed or rounding in cross section while the sides are substantially tangential to the rounding edge and to the corresponding sides of the main handle —2— so as to produce substantially smooth continuation of the main handle and allow the hand of the user to easily grip both handles without liability of undue strain or injury. The rivets —5— extend radially and centrally through the handles —2— and —3— and are finished flush with the outer rounding faces thereof so as to further avoid mutilation of the hand which is shown by dotted lines in Fig. —3— in the act of gripping the enlarged portion of the handle.

The ends of the auxiliary handle —3— are preferably beveled so as to converge downwardly and constitute abutments for the corresponding ends of the shield —4— to hold the latter against endwise displacement when assembled upon the main handle —2— in a manner presently described.

The shield —4— is preferably made of sheet metal and concavo-convex with its concave side facing the handle, the ends of the shield being bent or deflected in the same general direction or upwardly and terminate in spring clasps or open-sided loops —7— which are co-axial and are adapted to spring over and upon the periphery of the main handle —2— at opposite ends of the enlargement —3— to hold the shield in operative position against downward displacement, the opposite arms of each clasp —7— being provided with apertures —8— through which bolts or screws may be inserted into the main handle if desired, although in practice, the spring tension of the opposite arms of the clasp against the periphery of the main handle is ordinarily sufficient to retain the shield in place.

This is particularly true when the shield is provided with other means as ears or lugs —9— which are formed integral with the opposite ends thereof and overlap upon the opposite sides of the adjacent ends of the enlargement —3— of the handle as shown more clearly in Figs. —2— and —3—.

The lower edges of the enlargement —3— and shield —4— are substantially parallel with the lower side of the main handle —2— but are spaced sufficient distance apart to receive the fingers of the hand between them without liability of friction, the main body of the shield being of considerably greater width than its ends so as to extend from a position directly below the enlargement —3— to approximately the plane of the lower side of the main handle —2— to afford protection for the greater portion of the fingers and knuckles where they are most liable to contact with the walls of a trench or other excavation.

This construction of a shield enables it to be reversed upon the handle for use by either right or left hand operators and is especially adapted to the particular form of handle described to be used in connection therewith.

What I claim is:

1. A handle for shovels and similar implements having a relatively short enlargement projecting from its under side near its free end, and a protective shield clamped upon the main handle and abutting against the opposite ends of the enlargement.

2. A handle for shovels and similar implements having a relatively short enlargement projecting from its under side near its free end and a protective shield clamped upon the main handle and abutting against the opposite ends of the enlargement to hold the shield against endwise movement on the handle, said shield having ears upon opposite sides of said enlargement to hold the handle and shield against relatively lateral movement.

In witness whereof I have hereunto set my hand this 6th day of August, 1918.

WILLIAM COOPER.

Witnesses:
H. E. CHASE,
ETHEL M. WILLIAMS.

Copies of this patent may be obtained for five cents each, by addressing the "Commissioner of Patents, Washington, D. C."